United States Patent Office 3,067,106
Patented Dec. 4, 1962

3,067,106
SKIN TREATING METHOD AND COMPOSITION
Adolph M. Brown, Beverly Hills, Calif., assignor of fifty percent to The Foundation for Prosthetic Research, Los Angeles, Calif., and fifty percent to Mount Sinai Hospital (Research Fund), Los Angeles, Calif.
No Drawing. Filed Apr. 7, 1959, Ser. No. 804,568
18 Claims. (Cl. 167—90)

This invention relates to the elimination of rhitidosis or wrinkles in the skin and relates more particularly to a composition and to a method for using the composition for achieving controlled or calibrated contracture of the skin; removal of skin rhitides to cause the skin to be plane, flat, flush, sleek and glabrous thereby to provide a more youthful appearance and to remove blemishes, harsh, uneven or rugged surfaces and thereby to enhance the appearance of the skin. In my previously issued Patents No. 2,619,084, No. 2,575,204, and No. 2,575,205, description is made of devices and methods for the displacement by traction of loose skin from off of the face to tension the skin over the face whereby gross signs of age are partially eliminated and a more youthful and spirited appearance is developed. Such traction devices have been developed for usage instead of facials which are of questionable effect and only of very short duration, and they have been developed for use instead of a face lift which is a serious and relatively expensive surgical operation in which excess skin is cut from the face and the effect of which becomes dissipated within a period of 4 or 5 years.

While such traction devices are positive in their action to remove loose skin from off of the face, with corresponding removal of wrinkles, the effect is transient since it is available only while the devices are being worn. Thus the facial expression changes naturally depending upon the usage of the devices and even in the manner of usage.

It is an object of this invention to provide a means and method whereby a more permanent elimination of facial or skin rhitides can be achieved without resorting to the expense and concern of a surgical operation and it is a related object to provide a composition for use in the practice of same.

More specifically, it is an object of this invention to provide a means and method to induce contracture of the skin by permanent dermal fibrosis of the deeper layers of the skin whereby marked condensations are caused to take place in the fibrous tissue of the dermis and wherein connective tissues are caused to be laminated and flattened out with layers parallel to the skin surface to give a flattened and smooth appearance to the skin. It is a related object to effect removal of the surface portion or epidermis of the skin for elimination of blemishes or other harsh, uneven or rugged surfaces and to provide tension and smoothness indicative of youth.

The principal concept of this invention resides in the treatment of the skin to induce a controlled fibrosis of some of the inner layers of the skin to cause shrinkage by noticeable condensations of the collagenous fibers of the dermis and by lamination and flattening of some elements of the connective tissue parallel to the skin surface. This concept is achieved, in accordance with the practice of this invention, by the treatment of the surface of the skin with a phenolic body which, in the preferred practice of this invention, is formulated with a surface active agent which provides for deeper penetration into the deeper layers of the skin and with a retardent which obviates the reactions of such phenolic bodies as would otherwise cause complete destruction through the full thickness of the skin and consequently deep scar formation without the possibilities of regeneration. Such composition, which may be formulated of the phenolic body alone but preferably includes the retardent alone or in combination with the surface active agent, is maintained in an active state on the skin for an extended period of time to control fibrosis of the corium of the skin.

By varying the amount of surface tension, as by dilution with water and/or by the addition of a surface active agent, such as soap, bentonite and the like, it becomes possible to adjust the penetrating power of the phenolic body. By the addition of a retardent such as an oil, and variation in the amount thereof, it becomes possible to control the activity of the phenolic body whereby a controlled fibrosis and lamination of the underlying layers of the skin can be achieved not only safely to destroy the superficial layer of the skin by kerato-coagulation and keratolysis but also to penetrate between the cells of the skin and to act upon the inner surfaces of the cell in a manner to cause lamination of some of the fibrous tissues without killing such tissues and to cause fibrosis of the connective tissue for condensation and lamination, as previously described.

For purposes of description of the concepts of this invention, illustration will first be made of representative compositions which may be used in the practice of this invention and to the method of application and use; thereafter, an explanation will be made of what is believed to take place by way of reactions to cause removal of the surface layer of the skin and shrinking and flattening of the underlying layers permanently to alter the skin to a more youthful appearance.

The following are compositions which may be used in the practice of this invention:

*Example 1*

5 parts by volume cresol (saponated)
75 parts by volume phenol
0.1 part by volume vegetable oil (olive oil)
0.1 part by volume glycerine
19.8 parts by volume distilled water

*Example 2*

0.4 part by volume cresol
0.2 part by volume soap (potassium salt of fatty acid)
0.5 part by volume olive oil
50 parts by volume phenol
Add enough distilled water to make 100 parts

*Example 3*

5 parts by volume meta, para, or ortho-cresol
50 parts by volume phenol (U.S.P.)
0.25 part by volume sesame oil
0.5 part by volume croton oil
Add enough volume distilled water to make 100 parts
Trace of perfume (oils of lemon, lavender and clove)

*Example 4*

2.5 parts by volume of the mixture of meta, para, and ortho-cresol
2.5 parts by volume of soap
50 parts by volume of phenol
1.0 part by volume of olive oil
1.0 part by volume of sesame oil
Add enough volume of distilled water to make 100 parts

*Example 5*

95 parts by volume of cresylic acid saponified solution U.S.P.
0.5–5 parts by volume of vegetable oil (olive oil)
Trace of perfume
Add enough distilled water to make 100 parts

Example 6

50 parts by volume of meta, para, and ortho-cresol (tri cresol)
45–50 parts by volume of potassium saponified vegetable oil soap
0.5–5 parts by volume of vegetable oil
Trace of perfume The composition is formulated or otherwise applied as a thin layer onto the surface of the particular area of the skin to be treated. In the instance of elimination of facial rhitides, skin folds or the like, overall facial treatment is indicated which means application of the composition over the entire surface of the face skin. In the preferred practice, about ⅙ of the face is coated at a time, with at least a two-hour interval between applications, to allow the body to eliminate the phenolic bodies in small increments and thus avoid toxic effects of phenol absorption. After the skin has been coated and initial dryness has occurred by evaporation of the diluent and penetration of the solution, application is made of a cover to lower the vapor transmission rate. In practice, this can be achieved by the use of a facial mask fabricated of a rubber or other elastomeric, impermeable, or almost impermeable membrane. Instead of a mask, the treated area can be covered with tapes formed of an impermeable film-forming material, such as rubber or other elastomeric material, a laminate formed with a ply of polyethylene or other impermeable film material or the like having a pressure sensitive adhesive on one side for attachment onto the surface of the treated facial or other skin. All of the skin area with the exception of the openings of the eyes, nose and mouth can thus be covered materially to lower vapor transmission rate.

The purpose of the protective covering of the vapor impermeable or semi-impermeable material is to enable maceration further than would otherwise be available merely upon the application of the chemical composition. The irritation that is caused by the phenolic body brings about a response which comprises the exudation of serum from the skin. If the serum is permitted to dry, only a mild action of the chemicals is obtained consisting mostly of exfoliation of the surface skin. The protective covering of impermeable material blocks evaporation of the exuding body fluids and thus causes maceration. Greater penetration is thus achieved and the essential components are maintained in solution for reaction over a longer period of time.

After an extended period of time, such as 12 hours and preferably from 36 to 48 hours, the protective covering of vapor impermeable material is removed gently as by soaking or the use of a wax-coated applicator, rolling it under the tapes between the tape and the skin, to avoid avulsion of the remaining epithelium and possible scar formation. After removal, the skin will remain swollen in a state of tumescence and rubor for about one week but will return to normal a short time thereafter.

For a theoretical explanation of the reactions believed to take place, reference will now be made to the construction of the skin and the effect of the chemical components thereof. The skin can be divided into three sections; namely, (1) the outer epidermis, (2) the corium (dermis or true skin) and (3) the subcutaneous tissues.

The epidermis is a thin cellular layer in the surface of the skin characterized by a high metabolic rate. It is subject to kerato-coagulation and keratolysis by the chemical components of the treating composition and it falls from the skin to be replaced by a layer of epidermis which is smoother than the one removed responsive to the action of the chemicals thereof. Thus superficial blemishes, scars and uneven surfaces originally in the skin surface are effectively removed from the skin without the necessity to resort to the present techniques of abrading the skin or freezing the surface and sanding to remove the surface layer.

The corium is about 20 to 30 times thicker than the epidermis and it is composed mainly of non-cellular collagenous tissue having a lower metabolic rate than the epidermis. The subcutaneous layer is formed of fatty subcutaneous tissue and it functions as a base for the corium and has a shock absorber and heat insulator.

The corium which forms the main components of the skin layer can also be sub-divided into three principal elements; namely, cellular elements which are insignificant, the fibrous portion made up of reticular, collagenous and elastic fibers and a matrix which is formed of gelatinous material located between the fibers. The corium layer appears to be occupied by fibers of which the collagen makes up over 90%, and elastic most of the remainder. The collagenous fibers are whitish bundles of the sclero protein groups (albumenoids).

The phenolic component of the composition produces a coagulum when applied to the skin. The formed coagulum diminishes the permeability of the skin such that phenol is absorbed directly in proportion to the amount of dilution. Thus by varying not only the water content but also the surface tension, the use of the phenolic bodies can be varied to produce more or less keratocoagulation or more or less fibroid change, i.e. more fibrosis, lamination and compaction of the collagenous and elastic fibers of the dermis.

The process forming the subject matter of this invention strikes a balance by producing kerato-coagulation and partial epidermolysis with epidermo-coagulation. Deep in the dermis, a fibrosis is produced which is controlled by varying the concentration and the surface tension of the composition. The keratin and epidermis layers lose their surface integrity and are sloughed off to expose the remaining cells of the epidermis. The phenolic bodies thus penetrate not only via the altered epiderm but also by by-passing the epidermis and penetrating into the dermis through the follicular orifices and through the skin glands.

Once the keratinized layer is penetrated, traces of the phenolic bodies combine with some of the collagen elements of the deeper skin layers in an agglutinating action causing them to shrink in dimension which I have previously referred to as evidenced by a condensation of the fibrous tissue of the dermis. The result is a lessening of the skin surface or shrinkage.

The deeper squamous cell elements are not adversely affected yet, enough of the chemical agent passes through, between their interfaces, to cause contracture as evidenced mostly by changes in the collagen fibers. It may be that both the yellow elastic fibers and the white collagen fibers shrink in all directions with a concurrent tendency to stratify or laminate. The fibrous elements of the corium tend to flatten themselves and laminate parallel to the skin surfaces. Thus the chemical alters the pattern of the collagen and the elastic fibers which make up the dermis of the skin.

By introduction of a surface tension reducing agent and by increasing the amount thereof, the rate and the amount of penetration of the chemical can be increased to cause a corresponding increase in the reaction and the amount of fibrosis in the dermis of the skin. It will be apparent that such surface tension reducing agent is not essential to the practice of this invention, but is helpful in increasing the action when desired. When present, as in the form of a bentonite suspension or solution or an alkali metal soap or alkali metal saponified oil soap, an amount up to about 50% by weight of composition may be used, when other conventional surface active agents are used. The preferred concentration of surface active agent may be maintained within the range of 0.1 to 5% by volume of composition.

As a retardent, it is preferred to make use of an oil such as olive oil, castor oil, sperm oil, sesame oil or other animal or vegetable oil. By increasing the amount of oil, the amount of fibrosis in the dermis is decreased and vice versa. A retardent is a most desirable ingredient in the combination with the phenolic compound and, for this purpose, the amount of oil can be varied from 0.1 to 5% by volume of the composition.

As the phenolic component, use can be made of phenol or of cresol (cresylic acid) in the form of ortho, meta, or para-cresol or substituted cresols or mixtures thereof.

It is desirable to make use of water in an amount for solution of the phenolic component. When used, the amount of water should not exceed the amount of phenolic compound and it is preferred to make use of water in an amount less than ½ the volume of the phenolic component.

It will be apparent from the foregoing that I have provided a method and means which make use of chemical composition to effect a physical change in the structure of the skin consisting of a flattening of the skin with resulting elimination of skin rhitides alone or in combination with the elimination of surface skin previously containing blemishes, roughness, scars or the like. The described process and materials provide a technique for controlled or calibrated skin contracture with smoothing of the surface, removing the skin rhitides to cause the skin to be more youthful in appearance and the operation further to remove harsh, uneven or rugged surfaces in a simple, efficient and positive manner. Thus the change in skin condition can be achieved in a simple and efficient manner.

It will be understood that the process described need not be confined to facial skin. It can be practiced on the neck and hands to achieve contracture for more permanent tensioning of the skin and to remove gross blemishes or deformation in the surfaces of the skin.

It will be understood that this invention does not reside in the techniques of application or removal of the materials in skin treatment and that changes may be made in the details of the formulation, method of application, and treatment without departing from the spirit of the invention, especially as defined in the following claims.

I claim:
1. A composition for use in the treatment of skin for the removal of skin rhitides and blemishes comprising the combination of a major proportion of a phenolic compound from a group consisting of phenol, cresol, substituted cresols and mixtures thereof with a surface active agent and an oleaginous retardent.
2. A composition as claimed in claim 1 in which the surface active agent is present in an amount up to 50% by weight of the phenolic compound.
3. A composition as claimed in claim 1 in which the surface active agent is present in an amount within the range of 0.1 to 3.0% by weight of the composition.
4. A composition as outlined in claim 1 in which the surface active agent is an alkali metal soap.
5. A composition as claimed in claim 1 in which the oleaginous retardent is a vegetable oil.
6. A composition as claimed in claim 1 in which the retardent is present in an amount within the range of 0.1 to 5.0% by weight.
7. A composition for use in the treatment of skin for the removal of skin rhitides and blemishes comprising the combination of a major proportion of a phenolic compound from a group consisting of phenol, cresol, substituted cresols and mixtures thereof, a surface active agent, an oleaginous retardent, and water present in an amount sufficient at least to take the materials into solution.
8. A composition as claimed in claim 7 in which the surface active agent is present in an amount up to 50% by weight of the phenolic component.
9. A composition as claimed in claim 7 in which the oleaginous retardent is an oil present in an amount within the range of 0.1 to 5.0% by weight.
10. A composition as claimed in claim 7 in which the water is present in an amount less than the phenolic component.
11. A composition for use in the treatment of skin for the removal of skin rhitides and blemishes comprising the combination of a phenolic compound from a group consisting of phenol, cresol, substituted cresols and mixtures thereof, a soap solution present in an amount up to 50% by weight of the composition, an oil present in an amount within the range of 0.1 to 5.0% by weight of the composition and water present in an amount less than the phenolic compound.
12. The method of treating living skin to remove skin rhitides and blemishes comprising coating the surface of the skin with a fluid composition containing a major proportion of a phenolic compound from a group consisting of phenol, cresol, substituted cresols and mixtures thereof as an essential component thereof, covering the coated skin with a material having a low vapor transmission rate, and then removing the low vapor transmission coating from the treated surface of the skin after it had been in place for several hours.
13. The method as claimed in claim 12 in which the phenolic composition coated on the surface of the skin contains a surface active agent.
14. The method as claimed in claim 12 in which the phenolic composition applied to the surface of the skin contains an oleaginous material as a retardent.
15. The method as claimed in claim 12 in which the phenolic composition applied to the surface of the skin contains a surface active agent in an amount ranging from 0.1 to 3.0% by weight and an oleaginous retardent in an amount up to 0.1 to 5.0% by weight.
16. The method as claimed in claim 12 in which the phenolic composition applied to the surface of the skin contains water in an amount less than the phenolic compound.
17. The method as claimed in claim 12 in which the phenolic compound applied to the surface of the skin contains a surface active agent, an oleaginous retardent, and water with the latter being present in an amount sufficient to dissolve all of the other compounds.
18. The method as claimed in claim 12 in which the covering of impermeable material is not removed until it has been on the skin for at least 24 hours.

References Cited in the file of this patent

Reddish: Antiseptics, Disinfectants, Fungicides and Chemical and Physical Sterilization, Lea and Febiger, Philadelphia, Pa. (1957), pages 513–4.

Pharmaceutical Formulas, Chemist and Druggist, London, (1953), page 654.

Janowitz: Am. Perf. and Ess. Oil Review, 65:1, January 1955, pages 24–26.

American Druggist, November 1939, pages 32–33.

Sagarin: Cosmetics, Science and Technology, Interscience Publ. Inc., New York (1957), pp. 1156–7.

British Pharmaceutical Codex, 1949, pp. 674–5.

Eller et al.: J.A.M.A., vol. 116, No. 10, Mar. 8, 1941, pages 934–938.